US007321641B2

(12) United States Patent
Moulthrop et al.

(10) Patent No.: US 7,321,641 B2
(45) Date of Patent: Jan. 22, 2008

(54) BASEBAND TIME-DOMAIN COMMUNICATIONS SYSTEM

(75) Inventors: Andrew Alfred Moulthrop, Los Angeles, CA (US); Michael Steven Muha, Torrance, CA (US); Christopher Patrick Silva, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 631 days.

(21) Appl. No.: 10/860,232

(22) Filed: Jun. 3, 2004

(65) Prior Publication Data

US 2005/0271164 A1 Dec. 8, 2005

(51) Int. Cl.
*H03D 3/22* (2006.01)
(52) U.S. Cl. ...................................... 375/332
(58) Field of Classification Search ................ 375/316, 375/329, 331, 332, 349, 350; 331/179; 455/307; 708/300; 324/76.23, 76.19, 76.21, 615, 165, 324/173, 174; 340/825.6
See application file for complete search history.

(56) References Cited

U.S. PATENT DOCUMENTS 6,330,290 B1 * 12/2001 Glas ........................... 375/324
2004/0190479 A1 * 9/2004 Deane et al. ................ 370/339

* cited by examiner

Primary Examiner—Sam K. Ahn
(74) Attorney, Agent, or Firm—Derrick Michael Reid

(57) ABSTRACT

A communications system reduces downconverter inaccuracies in time-domain measurements or samples of received microwave communications I and Q complex signals by converting received signal to baseband taking measurements or samples of the I and Q waveforms at differing phase shifts of a demodulating carrier signal for a local oscillator or carrier tracking loop used during downconversion so that I and Q imbalances may be detected and removed by lowpass equivalent averaging for improved characterization of downconverters or for improved signal reception. In the preferred form, the phase shifts are 0 and $\pi/2$ for a conventional measurement, and then at $\theta$, and $\theta+\pi/2$, with $\theta=\pi/4+m\pi/2$ for an integer m for the second measurement where I and Q imbalances and baseband nonlinearities are indicated by differences between the two measured or sampled signals, where $\theta$ provides for optimum error detection for reducing the errors by averaging the measurements.

20 Claims, 5 Drawing Sheets

BALANCED BASEBAND RECEIVER SYSTEM

BASEBAND TIME-DOMAIN TEST CONFIGURATION

BASEBAND TIME-DOMAIN TRANSMITTER

BASEBAND TIME-DOMAIN RECEIVER

BALANCED BASEBAND RECEIVER SYSTEM

SIGNAL VECTOR PLOT IN I-Q COMPLEX COORDINATE SYSTEM

IDEAL & DISTORTED QPSK CONSTELLATION PLOT

BASEBAND TIME-DOMAIN COMMUNICATIONS SYSTEM

FIELD OF THE INVENTION

The invention relates to the field of measurement methods of electronic signals and devices. More particularly, the invention relates to baseband time-domain measurement methods of communications signals, such as modulated waveforms used in communication systems. Further still, the invention relates to methods for measuring the performance characteristics of nonlinear and linear devices used in communications systems such as power amplifiers used in transmitters. The invention further relates to receiver systems generating balanced baseband received signals for reducing imbalances in downconverters for improved signal reception.

BACKGROUND OF THE INVENTION

Modulated microwave signals are used to carry information in a wide variety of electronic communications systems. Examples include modulated microwave signals used to transmit voice and data or video signals from a ground transmitter through space to a satellite, and then back from the satellite to a ground receiver. Another example is a television transmitter, which transmits modulated signals that carry the picture and sound to television sets. Another example is a cellular base station, which transmits modulated microwave signals that carry the voice information to cellular phones. Such signals must be accurately measured for conformance to systems specifications and for accurate modeling of deviations from ideal performance.

It is also desirable to use such modulated microwave signals to characterize nonlinear devices, such as power amplifiers, used in communications systems, because these are the signals that the devices receive in operation. Nonlinear electronic devices are the most difficult elements to model accurately in communications simulations. A recent example is the design and simulation of power amplifiers for use in digital cellular applications. In this case, the transmit power amplifier must be operated at or near saturation for high efficiency, and still meet stringent adjacent channel power requirements. This is an example where accurate, computationally efficient nonlinear models are required to make the proper design tradeoffs. Also known as black-box models, these models are computationally efficient because they transform an input waveform to the correct output waveform without resorting to the details of circuit operation. These models seek to characterize the nonlinear amplifier through the use of a selected set of probing signals. The degree of predictive fidelity of these simulation models must be checked with the class of operational signals expected, such as modulated microwave signals.

Accurate measurement of communication signals in the time domain may be used to construct and validate high fidelity communications system and component models. This is a significant advance over the traditional technique of basing such models on single-tone vector-network-analyzer measurements of the component or system. Unlike single-tone measurements, time-domain waveforms contain all the information necessary to accurately characterize the component or system over the bandwidth of the waveforms. In particular, nonlinear interactions between different frequency components of a communications signal are captured in a time-domain measurement of the waveform, but ignored in a traditional single-tone frequency measurement.

Time-domain waveform measurements may be used to characterize nonlinear components such as power amplifiers. An outline of the procedure follows. A waveform source having the same modulation type as that intended for the application may be used as the test signal to be applied to the amplifier. Time-domain input and output measurements of these test signal waveforms capture the response of the power amplifier to the class of signals that are applied to it. In contrast, single-tone measurements cannot capture the nonlinear dynamic response of the amplifier to input signals having non-negligible bandwidth. A nonlinear model constructed from time-domain waveform measurements is accurate over wider bandwidths than models constructed from traditional single-tone input-output measurements.

The time-domain measurement of microwave communications signals is conveniently performed by first converting the microwave signal to baseband. This procedure yields inphase (I) and quadrature (Q) waveforms. The I and Q baseband waveform is commonly expressed in complex notation and is termed the lowpass equivalent (LPE) signal in the context of simulations. The accuracy of the measured waveform is limited by distortions introduced by the waveform measurement process. These distortions fall into four categories including linear filter distortions in the downconverting receiver, I and Q amplitude and phase imbalance, baseband nonlinearities such as amplifier compression and A/D non-ideality, and RF nonlinearities such as mixer compression. It is desirable to minimize the distortions. Limiting the input signal level to the downconverting receiver minimizes distortions due to baseband or RF nonlinearities. Linear filter distortions may be removed by a frequency-response calibration of the downconverter. The phase and amplitude response of the downconverting receiver cannot be measured directly by a vector network analyzer because the receiver input and output frequencies are different. The calibration procedure is used to extract the frequency response of the downconverting receiver by making three pair-wise measurements of two additional frequency converters and the downconverting receiver. One of the additional frequency converters must have a reciprocal frequency response, that is, the response must be the same whether it is used as an upconverter or a downconverter. This assumption of reciprocity is accurate enough to reduce linear filter distortions in the downconverting receiver to a low level over multi-Gigahertz bandwidths.

A prior procedure of measurement of modulated microwave signals is to record directly the radio frequency (RF) or microwave signal by means of a digital storage oscilloscope or other waveform recorder. For measurement of nonlinear devices, the RF or microwave frequency waveforms must be measured at the input and output of the device to find the input-to-output characteristic. These waveforms should be recorded at a number of input power levels throughout the operating range of the nonlinear device. Examples of such nonlinear components are a solid-state power amplifier or a traveling-wave tube amplifier. Time-domain instrumentation can record the waveform data digitally and store the data directly on a controlling computer.

Typical instruments used for recording waveform data are a digital storage oscilloscope (DSO), a microwave transition analyzer (MTA), or a recently developed large signal network analyzer (LSNA). The accuracy of these instruments for measuring high-frequency signals is limited by linear amplitude and phase distortion. The MTA and high bandwidth DSO have significant phase and amplitude distortion beginning at frequencies above about 15.0 GHz. The LSNA is based on an MTA, but the LSNA comes with calibration standards and an extensive calibration routine so that phase and amplitude distortion, and other errors, are analytically removed from the measurements. The LSNA performs calibrated time-domain measurements of signals up to 50.0 GHz. This LSNA includes calibration standards and software that calibrates the sampling oscilloscope for analog and digital nonlinearity, and gain and phase responses over a frequency range. Hence, the LSNA can provide accurate waveforms up to 50.0 GHz. The LSNA calibration eliminates any inaccuracy associated with the gain and phase response of the sampling oscilloscope, however, the LSNA still has limitations imposed by a limited number of samples and phase noise errors. The LSNA is an advanced and expensive system, however, and requires a specialized calibration procedure. Additionally, the LSNA can only be used to characterize arbitrary waveforms of a limited bandwidth.

Another prior waveform measurement approach is to use an uncalibrated downconverter with separate I and Q output signals. These I and Q output signals are then recorded by means of a DSO. This technique also yields the time-domain baseband waveform, but is corrupted by the linear filter distortions, and nonlinear baseband distortion, nonlinear RF distortions, and the I and Q imbalance between the I and Q signals in the downconverter. The unknown distortions can be large enough to severely limit the utility of the waveform data for a precision application such as communications system modeling.

A recent measurement approach measures the transmission response of a frequency-translating device (FTD), such as a mixer. The response of the FTD, including a downconverter, may be measured by means of the baseband-double-sideband-mixer FTD characterization method, as described in the related patent. In this FTD characterization method, three pair-wise combinations of an upconverter referred to herein as a transmitter, a test mixer, and the downconverter referred to herein as a receiver, are measured. The transmission response of the downconverting receiver is then calculated from these measurements. The test configuration setup for this FTD characterization method consists of connecting an upconverting transmitter FTD to a downconverting receiver FTD with both using the same local oscillator (LO) but with a phase shifter in the downconverter LO path. A vector network analyzer (VNA) is used to measure this first paired combination at two relative LO phase settings 90° apart. The additional test mixer is used in the second of these measurements as an upconverter and in the third of these measurements as a downconverter. The FTD characterization method requires that the test mixer have the same frequency response, which is a reciprocal frequency response, whether the test mixer is used as an upconverter or a downconverter. In practice, commonly available double-balanced mixers exhibit this reciprocal response if a low voltage standing wave ratio (VSWR) is provided on all ports by use of fixed attenuators. These six measurements, for the three configurations with zero and with ninety degree phase shift, are sufficient to extract the frequency response of all three FTDs, including the downconverting receiver. By mathematically combining the six measurements provided by the three-setup configuration, with and without the 90° phase shift, the lowpass equivalent (LPE) frequency response of the downconverting receiver may be obtained.

In U.S. Pat. No. 6,211,663 entitled Baseband Time-Domain Waveform Measurement Method, issued Apr. 3, 2001, a time-domain baseband measurement method measures modulated microwave signals typically used in communication systems by converting microwave signals to baseband before measurement for improved accuracy compared to direct measurement at the microwave frequency. A downconverting receiver is first characterized using a prior characterization method and then the modulated microwave signal is applied to the downconverting receiver and the response of the downconverting receiver is removed to provide an accurate characterization of the modulated microwave signal. Such an accurate measurement of the modulated microwave signal can be used for communications system performance verification as well as for characterizing communications devices and systems. One particular application is the measurement of input/output characteristics of nonlinear power amplifiers using such modulated microwave signals. Such a system produces imbalances of the I and Q signals upon carrier demodulation. The method includes inserting local oscillator phase shifts for measuring downconverter DC offsets. However, the method does not remove all I and Q imbalances that lead to distortion of the input signal during downconversion. These and other disadvantages are solved or reduced using the invention.

SUMMARY OF THE INVENTION

An object of the invention is to provide a system for measuring imbalances in downconverters.

Another object of the invention is to provide a system for providing lowpass equivalent of received signals.

Yet another object of the invention is to provide a system for determining lowpass equivalencies of received signals by removing downconverter imbalances.

Still another object of the invention is to provide a system for providing baseband lowpass equivalencies of received signal by removing downconverter imbalances using selected phase shift of a demodulating carrier signal.

A further object of the invention is to provide a system for providing baseband lowpass equivalencies of received signal by removing downconverter imbalances using selected phase shift of a demodulating carrier signal using 0 and $\pi/2$ phase shifts for providing a first baseband lowpass equivalence of received I and Q complex signals and using $\theta$ and $\theta+\pi/2$ phase shifts for providing a second baseband lowpass equivalence of the received I and Q complex signals.

Yet a further object of the invention is to provide a system for providing baseband lowpass equivalencies of received signal by removing downconverter imbalances using selected phase shift of a demodulating carrier signal using 0 and $\pi/2$ phase shifts for providing a first baseband lowpass equivalence of received I and Q complex signals and using $\theta$ and $\theta+\pi/2$ phase shifts for providing a second baseband lowpass equivalence of the received I and Q complex signals with $\theta=\pi/4+m\pi/2$ where m is an integer.

The present invention is directed towards a system for minimizing inaccuracies in time-domain measurements of microwave communications signals and for removing the effects of downconverter imbalances in communication receivers. The signal measurements are accomplished by converting the signal to baseband where accurate instrumentation is available. The baseband signal is a complex signal composed of I and Q components. The I and Q waveform measurements differ by $\pi/2$ phase shifts of a carrier signal provided by a local oscillator (LO) or carrier tracking loop used in the downconversion. Any I and Q imbalances may be detected and reduced by requiring the complex baseband signal to be invariant and apart from a rotation in the complex plane that corresponds to a change in the local oscillator phase. The complex baseband signal is measured or sampled twice, where the LO phase shift is 0, and $\pi/2$ for the first signal measurement or sampling, and θ, and θ+π/2 for the second. Any I and Q imbalances and baseband nonlinearities are indicated by differences between the two measured or sampled signals. The LO phase shift of θ=π/4+mπ/2, where m is an integer, is optimum for error detection and imbalance correction of the generated lowpass equivalencies of the measured or sampled signal. The imbalance errors may be reduced by averaging the measurements and by optimization of the measurement system. Errors caused by I and Q imbalances have been reduced to an error-to-signal power ratio of less than −56 dB. This accuracy is sufficient for communications system modeling applications.

For waveform measurements, the invention reduces I and Q imbalances as a function of frequency because the same downconverting receiver is used for both waveforms. However, an overall phase imbalance may be caused by errors in the phase shifts. Similarly, an overall amplitude imbalance may be caused by LO power level changes between the measurement of the I and Q components. Measurement errors or imbalances caused by I and Q imbalances and baseband nonlinearities are quantifiable and hence, can be removed. The communication system can be adapted to minimize imbalance errors to enhance the usefulness of baseband waveform measurements and receivers. These and other advantages will become more apparent from the following detailed description of the preferred embodiment.

DETAILED DESCRIPTION OF THE PREFERRED EMBODIMENT

Figure 1:
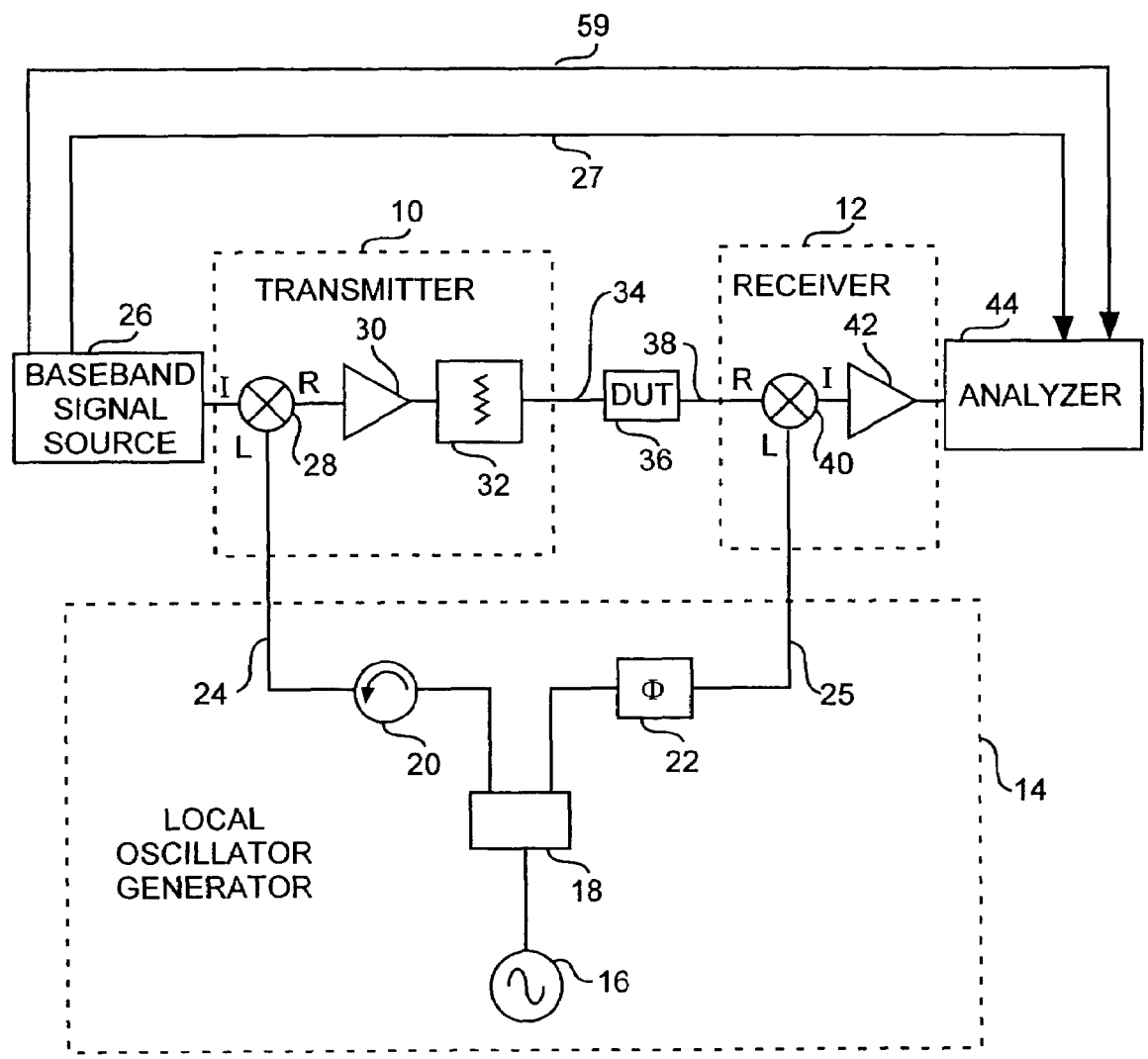
FIG. 1 is a schematic of a baseband time-domain test configuration.
Figure 2:
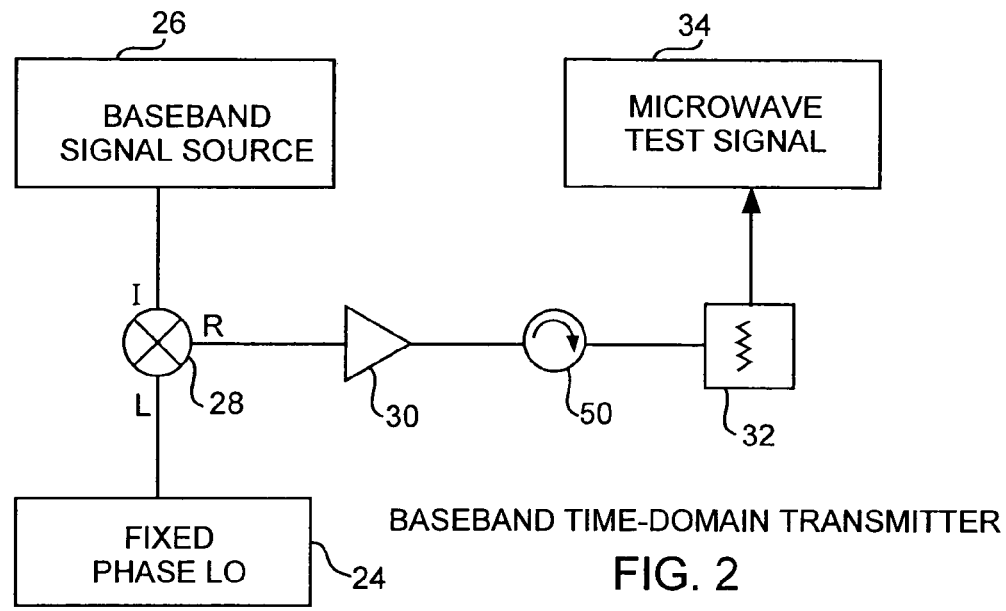
FIG. 2 is a block diagram of a baseband time-domain transmitter.
Figure 3:
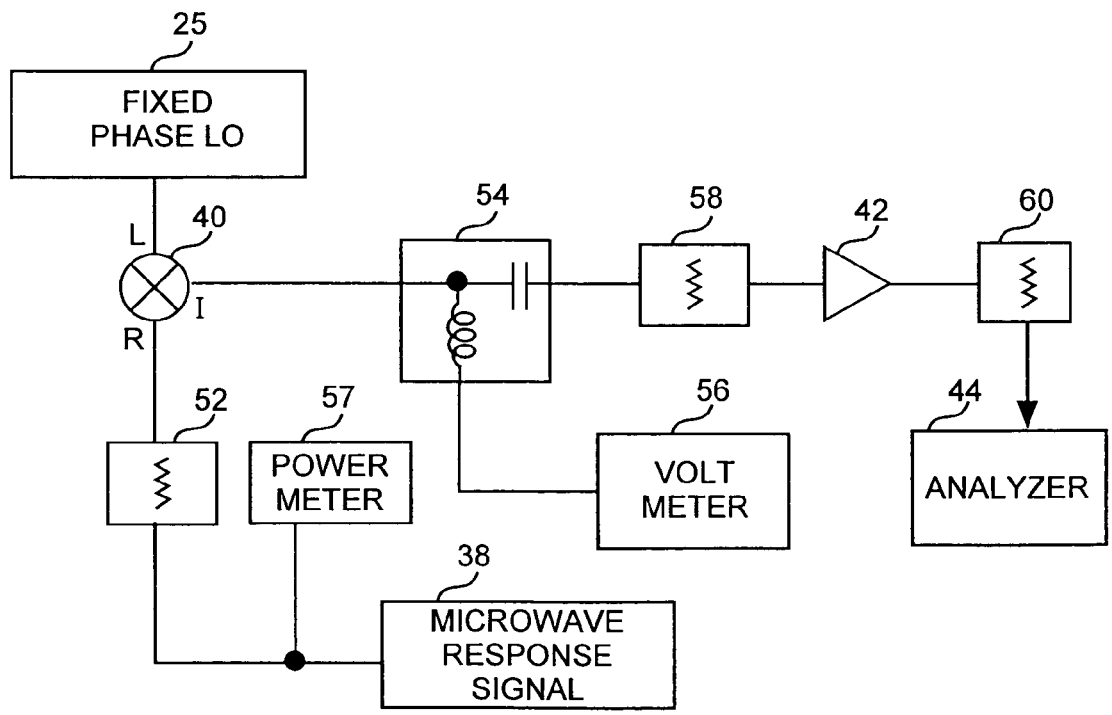
FIG. 3 is a block diagram of a baseband time-domain receiver.

An embodiment of the invention is described with reference to the figures using reference designations as shown in the figures. Referring to FIGS. 1, 2 and 3, the baseband time-domain basic measurement test configuration system consists of an upconverting transmitter 10 and a downconverting receiver 12, both driven by a local oscillator generator 14, for measuring baseband waveforms. The oscillator generator 14 includes a local oscillator (LO) 16, a splitter 18 providing a local oscillator signal to an isolator 20 and phase shifter 22. The isolator 20 provides a fixed phase local oscillator signal 24 that may be considered as a carrier signal. The phase shifter 22 provides a variable phase local oscillator signal 25 that is used for coherent downconversion. In a broad form, the preferred transmitter 10 is driven by a baseband signal source 26 for providing a baseband test signal to the transmitter 10 and for providing a 10 MHz reference signal 27 and a trigger signal 59. The transmitter 10 includes a mixer 28, microwave amplifier 30 and attenuator 32. The baseband signal source 26 provides the baseband test signal that drives the upconverter 28 receiving the fixed phase LO signal 24 for providing an upconverted signal to the microwave amplifier 30 that in turn drives the attenuator 32 providing a microwave test signal 34. When testing a device under test (DUT) 36, the microwave test signal is applied directly to the DUT 36 providing a microwave response signal 38. When characterizing an arbitrary microwave test signal, such as the microwave test signal 34, the microwave test signal 34 becomes a microwave test signal 38 applied directly to the receiver 12. Hence, the transmitter 10 can be any arbitrary system providing an arbitrary repetitive modulated microwave test signal 34. In the broad form of the invention, the microwave test signal 34 is the microwave test signal 38 connected directly to the receiver 12 for characterization of the microwave test signal 34 and 38 without characterizing the DUT 36 with the DUT 36 effectively removed as a short circuit having no responsive characteristics.

In preferred form, the DUT 36 is inserted between the transmitter 10 and receiver 12. The receiver 12 includes a downconverter 40 and a baseband amplifier 42. When excited by the microwave test signal 34, the inserted DUT 36 provides a microwave response signal 38 to a downconverter 40 that also receives the variable phase LO signal 25 and provides a downconverted signal to the baseband amplifier 42 that in turn provides a baseband response signal that is recorded by an analyzer 44. The microwave signals 34 and 38 of the DUT to be measured can have any arbitrary repetitive phase or amplitude modulation, but the microwave signals 34 and 38 must be accompanied by unmodulated LO signals 24 and 25 to respective upconverter 28 and downconverter 40 of transmitter 10 and receiver 12, respectively. The trigger signal 59 must also be supplied to analyzer 44, while the reference signal 27 is optional. The transmitter 10 and receiver 12 operate respectively using the fixed phase LO signal 24 and the variable phase LO signal 25, which are coherent LO signals. These coherent Lo signals 24 and 25 are used during testing and calibration procedures. The analyzer 44 is preferably a microwave transition analyzer (MTA), but could also be a digital storage oscilloscope (DSO) used in place of the MTA with reduced accuracy, because most DSOs do not have the calibrated accuracy of an MTA. The transmitter 10 may further include an isolator 50 connected between the microwave amplifier 30 and attenuator 32. The downconverting receiver 12 may further include a bias tee coupler 54 for providing a voltage signal to a voltmeter 56. A power meter 57 is used to measure the power of the microwave test signal, from the transmitter 10, or the microwave response signal 38 when the DUT 36 is inserted. The receiver 12 may further include attenuators 58 and 60 for impedance matching. The DC level of the downconverted signal from the downconverter 40 is separated from the LPE signal by the bias tee 54 and corresponds to the Fourier component at the LO frequency. The DC level that is separated by the bias tee 54 is measured by the volt meter 56 at the output of the downconverter 40 that may also be a mixer. The measurement of the DC level is preferred because the baseband amplifier 42 blocks the DC component of the baseband response signal from the downconverter 40. The frequency stability requirements on the local oscillator signals 24 and from oscillator 16 need not be high because the phase noise is canceled by downconversion in the receiver 12. The baseband modulation signal provided to the upconverter 28, which is a mixer 28, however, must be stable, preferably with a 10.0 MHz reference output 27 to be used by the MTA 44 as an external reference. The modulating baseband source 26 must also be used to trigger the MTA 44 using trigger signal 59.

The transmitter 10 provides the microwave test signal 34 to the DUT 36 or to the receiver 12 to produce the baseband LPE waveform that is recorded by the MTA 44. At the same time, the DC component at the phase shifter setting is recorded, scaled to take into account the gain of the baseband amplifier 42, and added to the baseband LPE waveform. The phase shifter 22 is then adjusted by 90° and the downconverted baseband signal and the corresponding DC component are again recorded and combined to yield the uncorrected quadrature component of the LPE signal. Enhanced measurement accuracy of the Fourier component at DC is provided by performing a zeroing procedure consisting of another DC measurement at both phase settings with no microwave test signal input and subtracting the DC values thus obtained from the measurements with the microwave test signal applied. This zeroing procedure may be applied periodically to eliminate drift. If the ultimate DC component accuracy is required, measurements at four phase settings are used to provide enhanced cancellation of DC mixer offsets. The 0° and 135° measurements are combined to form the inphase component, and the 90° and the inverse of the 225° measurements are combined to form the quadrature component. This procedure eliminates any drift that can occur during the time interval between the DC zeroing procedure and the time at which the baseband waveform data is recorded. Because the same downconverting receiver 12 is used to measure both the I and the Q waveforms, there is no I/Q imbalance. The LPE signals thus obtained include the frequency response of the receiver 12 and are therefore uncorrected. To obtain corrected LPE signals, the frequency response of the receiver 12 must be removed. The response of the receiver 12 is removed analytically from the uncorrected signals by means of the prior baseband-double-sideband frequency translating device FTD characterization method. The receiver response may then be removed analytically from the uncorrected LPE signal measurements, leaving an accurate LPE representation of the microwave test signal.

Figure 4:
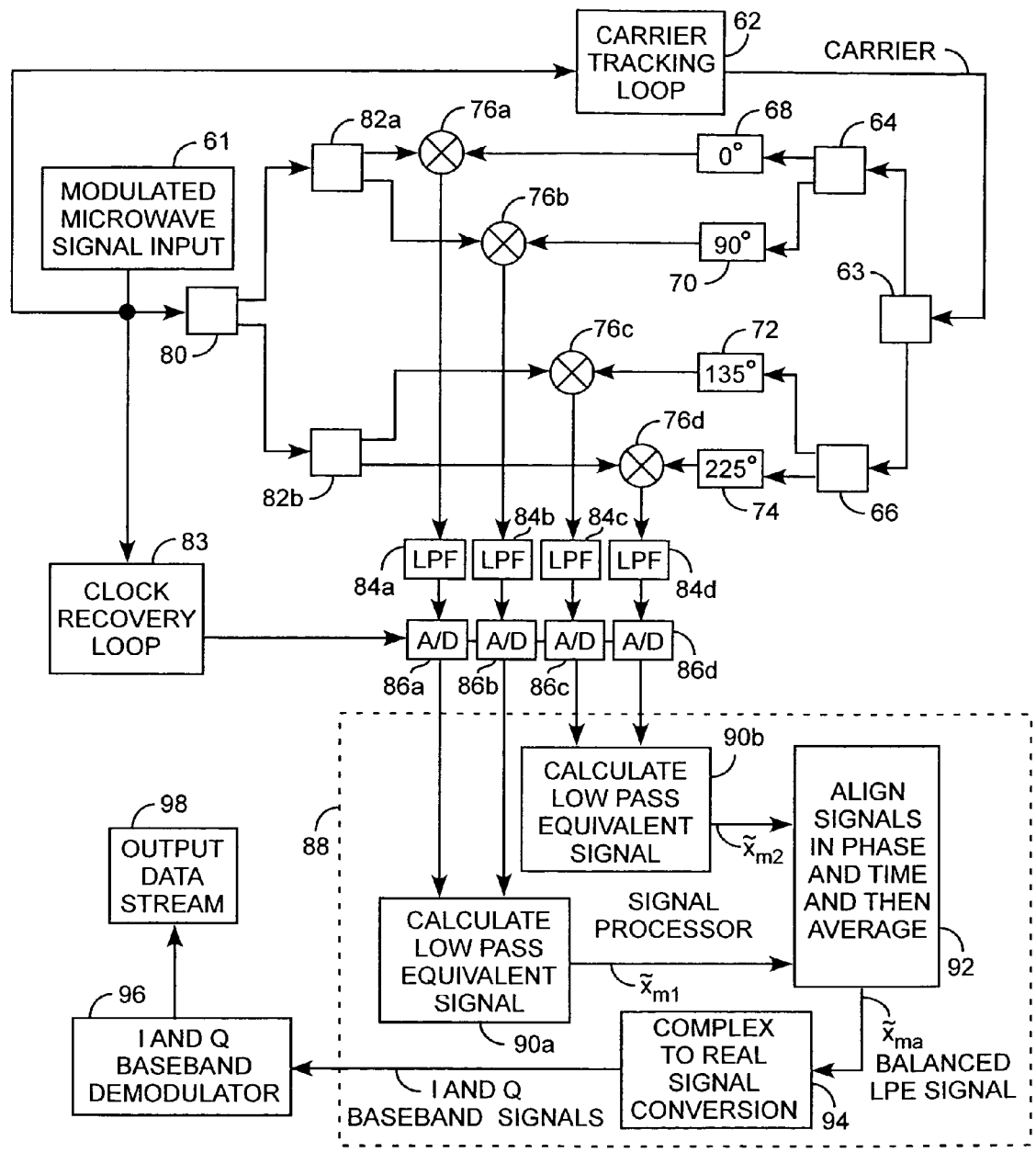
FIG. 4 is a block diagram of a balanced baseband receiver system.
Figure 5:
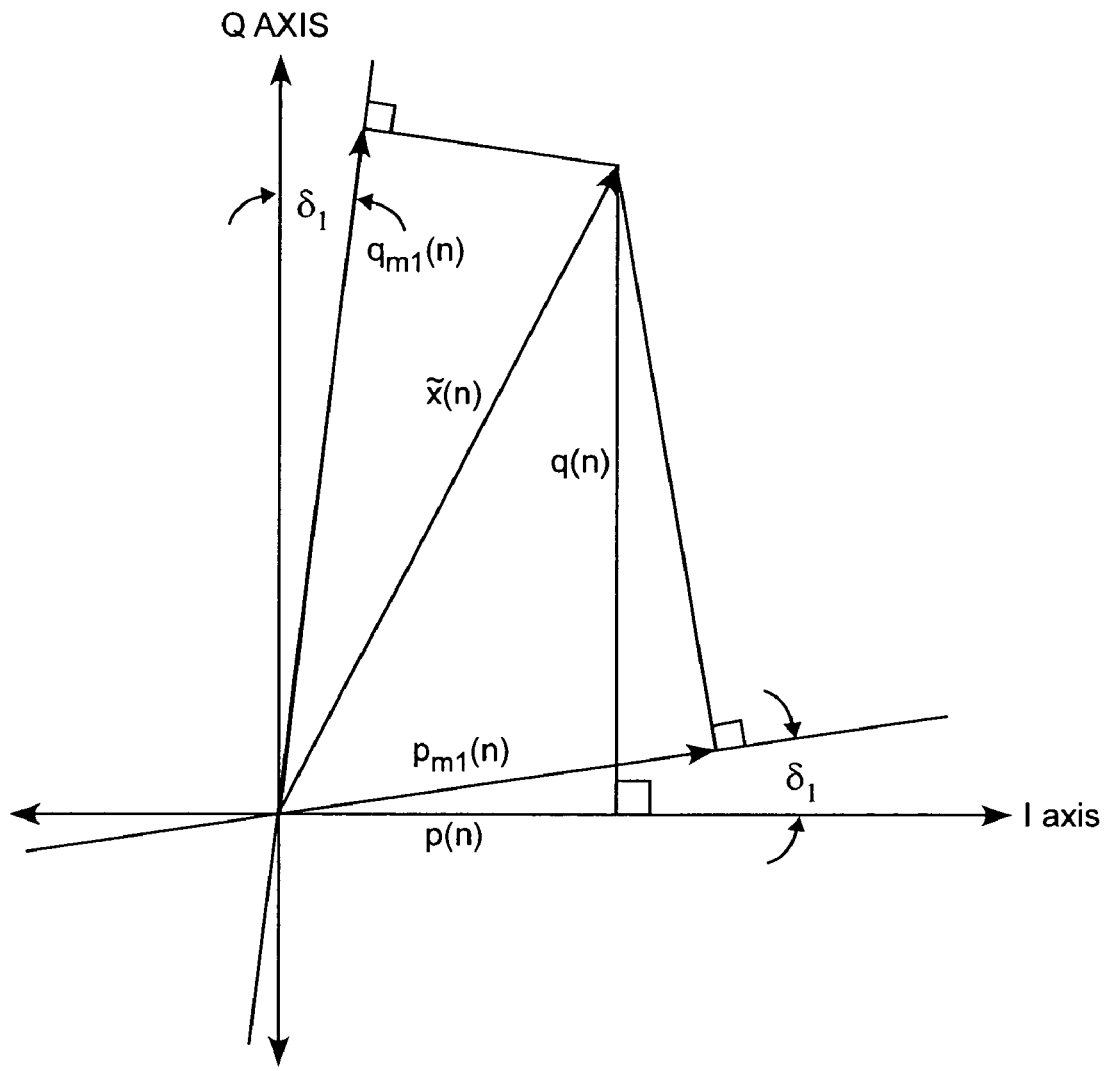
FIG. 5 is a graph of a signal vector plot in an I-Q complex coordinate system.
Figure 6:
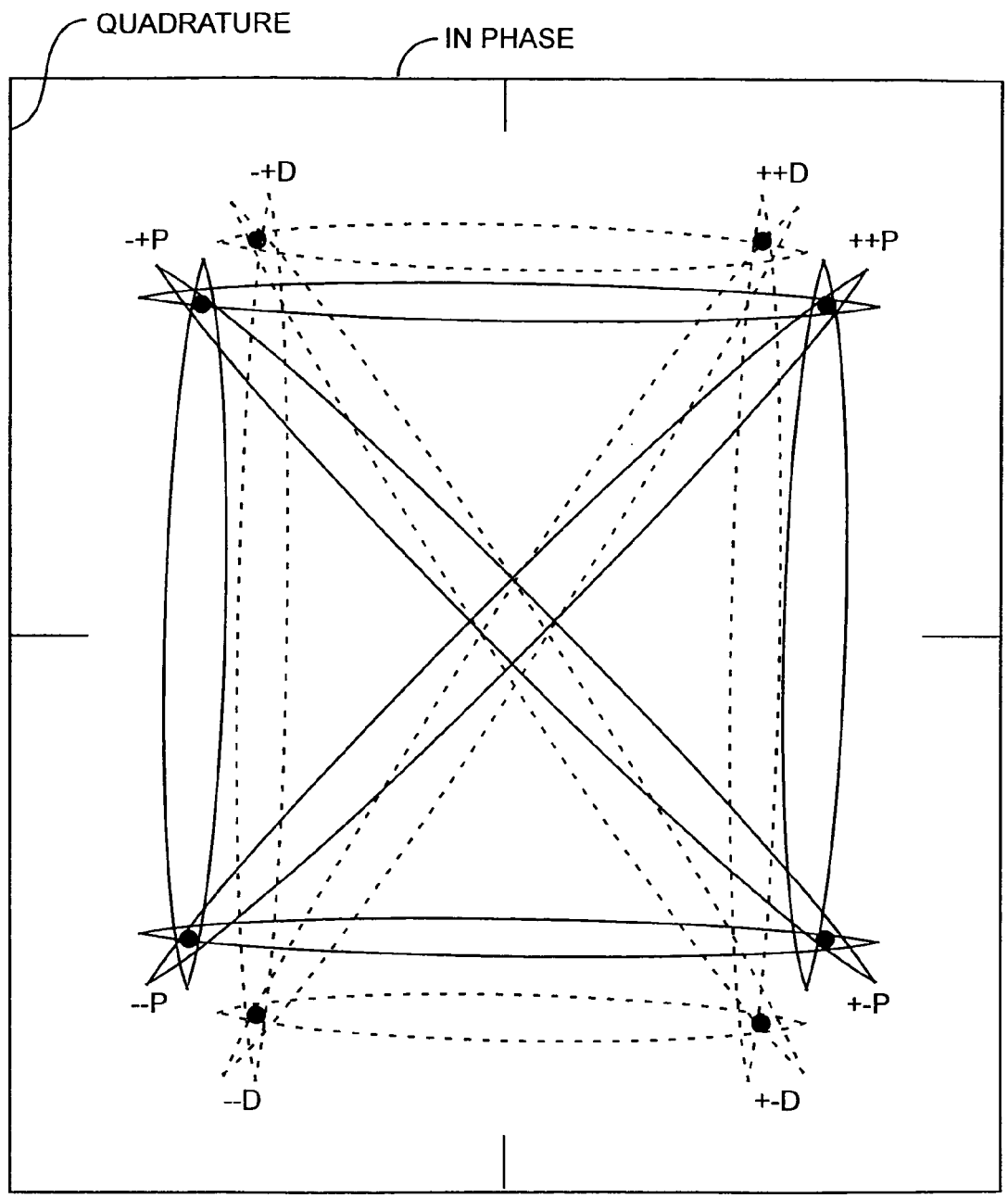
FIG. 6 is a graph of an ideal and distorted QPSK constellation plot.

Referring to FIGS. 4, 5 and 6, the test method can be implemented in a receiver system that eliminates downconverter imbalances for improved performance using modulated signals 61. The function of signal modulation is to carry information from a transmitter to the receiver, typically in quadrature. The modulation format may be any amplitude-phase-shift-keyed modulation, such as quadrature-phase-shift-keying (QPSK) having four or more distinct amplitude and phase states such as those shown in FIG. 6. The function of the receiver is to convert and process the received signal 61. The balanced baseband receiver system receives the modulated signal 61 at the input at the defined carrier frequency using carrier modulation. The modulated signal 61 is fed into a carrier-tracking loop 62 for extracting the carrier, as is conventional practice. The carrier signal is then split by splitters 63, 64, and 66 for providing four carrier replicas that are respectively fed into a 0° phase shifter 68, a 90° phase shifter 70, a 135° phase shifter 72, and a 225° phase shifter 74. The 0°, 90°, 135°, and 225° phase shifted carrier replicas are respectively fed to downconverters 76a, 76b, 76c, and 76d. The input signal 61 is also split four ways using splitters 80, 82a, and 82b for generating four input signal replicas. Each input signal replica from the splitter 80, 82a, and 82b, is downconverted by the downconverters 76a, 76b, 76c, and 76d, which form two I and Q pairs. The function of the first pair of downconverters 76a and 76b is to remove the carrier relative to two particular phases of the carrier at 0° and 90°. The two baseband outputs of the first I and Q converters 76a and 76b are independent carrier demodulated signals which have an orthogonal phase relationship to each other.

The function of the second pair of downconverters 76c and 76d to remove the carrier relative to two particular phases of the carrier at 135° and 225°. The two baseband outputs of the second I and Q converters 76c and 76d also provide independent carrier demodulated signals, which also have an orthogonal phase relationship to each other.

The output of the first pair of I and Q downconverters 76a and 76b, and the output of the second pair of I and Q downconverters 76c and 76d are ideally identical to each other within a rotation of 135° in the complex plane. However, when the enhanced receiver is implemented in hardware, there are several factors that make the outputs of the two converters less than perfect, even after precise rotation in the complex plane of 135° of the output of the first downconverter pair. First, the amplitude and phase responses of the downconverters are never perfectly identical. Second, the phase shifters that define the phase shift applied to the carrier input of each of the downconverters are never perfectly realized. Third, the power splitters 68, 70, 72, and 74 that are used to split the signals also introduce phase and amplitude errors. Hence, signal processing is required to remove these errors, using a sampling clock signal from a clock recovery loop 83. The low-pass filters (LPF) remove the unwanted upper sidebands and out-of-band noise present at the outputs of each of the four mixers. The filtered outputs of the mixers are then applied to the inputs of four analog-to-digital (A/D) converters to convert the analog outputs of the downconverting mixers 76a, 76b, 76c, and 76d to a binary representation of a number proportional to the instantaneous signal amplitude. The instantaneous signal amplitude at the input to the A/D converter is sampled synchronously at the transmitted data rate when triggered by the recovered data clock from the clock recovery loop 83. The downconverted signals from the downconverting mixers 76a, 76b, 76c, and 76d, are first passed through respective lowpass filters 84a, 84b, 84c, and 84d, and then digitized using respective A/D converters 86a, 86b, 86c, and 86d, for respectively providing a 0° phase shifted demodulated digital signal, a 90° phase shifted demodulated digital signal, a 135° phase shifted demodulated digital signal, and a 225° phase shifted demodulated digital signal. The outputs of the downconverter mixers 76a, 76b, 76c, and 76d are representations of the components of the four LPE signals. The 0° downconverter mixer 76a will produce the inphase component $p_{m1}$ (n), and the 90° down converter mixer 76b will produced the quadrature component $q_{m1}$ (n). Likewise, the downconverter mixers 76c and 76d will produce the same output, that is, the 135° downconverter mixer 76c will provide an inphase component $p_{m2}$ (n) and the 225° downconverter mixer 76d will produce the quadrature component $q_{m2}$ (n), but both rotated by 135°. In terms of $p_{m1}$ (n) and $q_{m1}$ (n), the output of the second downconverter pair 76c and 76d may be expressed as $\tilde{x}_{m2}$ (n)=+(1/$\sqrt{2}$) [$p_{m1}$ (n)−$q_{m1}$ (n)]−(j/$\sqrt{2}$) [$p_{m1}$ (n) +$q_{m1}$ (n)], where $p_{m1}$ (n) is the inphase component and $q_{m1}$ (n) is the quadrature component of the received signal $\tilde{x}_{m1}$(n). The outputs of the A/D converters 86a, 86b, 86c, and 86d are digitized versions of the downconverter mixer outputs. These four phase shifted demodulated digital signals are communicated to a signal processor 88 for removing errors and imbalances during splitting and downconverting, as shown by dashed lines for QPSK in FIG. 6 having D constellation points as opposed to an ideal constellation having P constellation points.

The purpose of the signal processor 88 is to remove or minimize errors and imbalances generated during splitting and downconverting of the received signal by application of analytical techniques. The 0° phase shifted demodulated digital signal and the 90° phase shifted demodulated digital signal for a first pair of downconverted digital signals, and the 135° phase shifted demodulated digital signal and the 225° phase shifted demodulated digital signal for a second pair of downconverted digital signals. The signal processor 88 can be an application specific integrated circuit (ASIC), a field programmable gate array (FPGA), or a microcomputer executing software for implementing signal processing functions 90a, 90b, 92, and 94 and conventional hardware for implementing signal conversion. The signal processor 88 computes a lowpass equivalence (LPE) $\tilde{x}_{m1}$ for the first pair of digital signals of the first I and Q downconverter pair 76a and 76b, and, computes a LPE $\tilde{x}_{m2}$ for the second pair of digital signals of the second I and Q downconverter pair 76c and 76d.

Once the four downconverted signals are in digital form, digital processing can be applied. Specifically, the first pair of digital signals can be digitally combined to form the LPE signal represented $\tilde{x}_{m1}$ as a first measurement, and the second pair of digital signals can be digitally combined to form the LPE signal represented $\tilde{x}_{m2}$ as a second measurement, by LPE calculate functions 90a and 90b. Then, the first and second LPE measurement $\tilde{x}_{m1}$ and $\tilde{x}_{m2}$ are aligned in phase using an alignment in phase and time and averaging function 92 for providing a balanced LPE signal $\tilde{x}_{ma}$. These signal processing functions are closed-form computations that can be implemented in an ASIC, FPGA, or microcomputer. The result of the signal processing steps 90a, 90b, and 92 is an LPE signal that is automatically corrected for amplitude and phase imbalances in the downconverters mixers 76a, 76b, 76c, and 76d, and splitters 80, 82a, 82b, 63, 64, and 66. The balanced LPE $\tilde{x}_{ma}$ signal can then be converted into real form by conventional complex to real signal conversion for providing I and Q baseband signals that are digital signals that can then be demodulated using an I and Q baseband data demodulator 96 that provides an output data stream 98.

Referring to all of the figures, the removal of imbalances on the received signal in the enhanced receiver system can be modeled. Waveform measurement error and imbalances are conveniently defined in terms of a normalized mean square error metric (NMSE). The NMSE metric is used to determine quantitatively the distance between two waveforms. It is two times the sum over all sample points of the square of the voltage difference between the two waveforms divided by the sum over all sample points of the square of the voltages in both waveforms, which is minimized with respect to phase and time. Equivalently, this may be expressed as the total error power between the two waveforms divided by the arithmetic average of the power in the two waveforms. The NMSE is calculated from the complex, LPE waveforms $\tilde{x}_{m1}$ and $\tilde{x}_{m2}$ in an NMSE equation.

$$NMSE(\tilde{x}_{m1}, \tilde{x}_{m2}) = \min_{\varphi,k}\left[2\frac{\sum_n |\tilde{x}_{m1}(n+k)e^{-j\varphi} - \tilde{x}_{m2}(n)|^2}{\sum_n |\tilde{x}_{m1}(n)|^2 + \sum_n |\tilde{x}_{m2}(n)|^2}\right]$$

The NMSE for LPE waveforms is minimized with respect to phase $\phi$ and time index k by aligning the waveforms in time and in the complex plane. An NMSE algorithm used for repetitive waveforms is a complex circular cross-correlation function. In this circular cross correlation, the waveforms are rotated relative to each other. The maximum value of the cross-correlation algorithm indicates proper phase and time alignment of the two waveforms. To obtain fine time resolution, the waveforms are upsampled by a factor of ten or more over hardware sampling, using linear or sinc interpolation, to obtain finer time resolution. An alternative, frequency domain algorithm may be used. The frequency-domain algorithm is faster than the time-domain algorithm because upsampling is not required.

The phase shift error analysis proceeds from an LPE signal representation equation $\tilde{x}(n)=p(n)+jq(n)$. The received signal $\tilde{x}(n)$ has an inphase component p(n), and a quadrature component q(n). One point of this waveform is shown in vector form in the complex plane in FIG. 5. The I and the Q axes are $\pi/2$ apart. However, in a measurement, the axes may deviate from $\pi/2$ by a small total LO phase shifter setting error $2\delta_1$. This total error may be symmetrically distributed between the I and Q components to simplify the following error analysis. The LO phase shift between the I and Q components during sampling is $(\pi/2)-2\delta_1$, where the phase shifter setting error, $\delta_1 \ll 1$. Using this assumption, the measured waveform is defined by an $\tilde{x}_{m1}$ first measurement equation.

$$\tilde{x}_{m1}(n)=p_{m1}(n)+jq_{m1}(n)=p(n)+\delta_1 q(n)+j[q(n)+\delta_1 p(n)]$$

If the measurement or sampling is repeated, and the error $\delta_1$ is the same for both measurements, with $\delta_1=\delta_2$, the two waveforms will agree perfectly to within a bound set by the measurement system noise level. Both measurements are in error compared to the actual waveform, but the error cannot be determined. However, the invariance of the signal with respect to the absolute value of the LO phase allows detection of the error caused by $\delta_1$. The second measurement is taken after inserting an absolute LO phase shift $\theta$, by means of the second phase shifter. To preserve the generality of the analysis, the second measurement is assumed to have a different angular error Of $\delta_2$ instead of $\delta_1$. The second measurement is then given by an $\tilde{x}_{m2}$ second measurement equation with $\delta_2 \ll 1$.

$$\tilde{x}_{m2}(n)=p(n)\cos\theta+q(n)\sin\theta+q(n)\delta_2\cos\theta-p(n)\delta_2\sin\theta+j[q(n)\cos\theta-p(n)\sin\theta+p(n)\delta_2\cos\theta+q(n)\delta_2\sin\theta]$$

First and second measurements can be compared by means of the NMSE equation. As shown in FIG. 5, the signal vectors are plotted in an I and Q complex coordinate system. Measurement axes are skewed by the error angle $\delta_1$ and the projections along these I and Q axes can be measured. The ideal signal vector is p(n)+jq(n) while the measured signal is $p_{m1}(n)+jq_{m1}(n)$. However, as in the NMSE equation, $\tilde{x}_{m1}(n)$ must be rotated analytically by an angle $\phi$ to line it up with measurement $\tilde{x}_{m2}(n)$ using a rotated measurement equation.

$$\tilde{x}_{m1}e^{-j\phi}=p(n)\cos\phi+q(n)\delta_1\cos\phi+q(n)\sin\phi+p(n)\delta_1\sin\phi+j[q(n)\cos\phi+p(n)\delta_1\cos\phi-p(n)\sin\phi-q(n)\delta_1\sin\phi]$$

The NMSE between $x_{m1}(n)$ and $x_{m2}(n)$, where the time alignment between the two measured waveforms has already been performed, is defined by a difference NMSE equation.

$$NMSE(\tilde{x}_{m1}, \tilde{x}_{m2}) = \min_{\varphi}\left[2\frac{\sum_n |\tilde{x}_{m1}(n)e^{-j\varphi} - \tilde{x}_{m2}(n)|^2}{\sum_n |\tilde{x}_{m1}(n)|^2 + \sum_n |\tilde{x}_{m2}(n)|^2}\right]$$

From the first and second measurement equations and the difference NMSE equation, and minimizing with respect to phase $\phi$, an alignment and phase equation provides an expression for $\phi$.

$$\varphi = -\tan^{-1}\left[\frac{(\delta_1\delta_2 - 1)\sin\theta \sum_n [p(n)^2 + q(n)^2] +}{(\delta_2 - \delta_1)\sum_n [(p(n)^2 - q(n)^2)\cos\theta + 2p(n)q(n)\sin\theta]}{(\delta_1\delta_2 + 1)\cos\theta \sum_n [p(n)^2 + q(n)^2] +}{(\delta_2 + \delta_1)\sum_n [(q(n)^2 - p(n)^2)\sin\theta + 2p(n)q(n)\cos\theta]}\right]$$

The communication signals analyzed can be approximated with an approximate rotation of $\phi=\theta$, by assuming a four quadrant equation.

$$\left|\sum_n [q(n)^2 - p(n)^2]\right| \ll \sum_n q(n)^2$$

The approximation also assumes a negligible DC component equation.

$$\sum_n p(n)q(n) \ll \sum_n p(n)^2$$

The four quadrant equation and negligible DC component equation applies to waveforms having 4-fold rotational symmetry, for example, QPSK and 16-QAM. The approximation of the negligible DC component equation applies to baseband waveforms having a power in the DC component small compared to the total power. This applies to most amplitude and phase-shift keyed waveforms, but not AM, for example. Assumptions of the four quadrant equation and the negligible DC component equation is applied to subsequent NMSE calculations. Applying the four quadrant and the negligible DC component equations to the alignment and phase equation provide that $\phi=\theta$. In practice, the software algorithm provides the optimum value of $\theta$ from the two measured waveforms, thus determining the experimentally unknown value of $\theta$ for providing an expanded NMSE equation.

$$NMSE(\tilde{x}_{m1}, \tilde{x}_{m2}) =$$

$$\sum_n \frac{\left\{\begin{array}{l}[q(n)\delta_1\cos\theta + p(n)\delta_1\sin\theta - q(n)\delta_2\cos\theta + p(n)\delta_2\sin\theta]^2 + \\ [p(n)\delta_1\cos\theta - q(n)\delta_1\sin\theta - p(n)\delta_2\cos\theta - q(n)\delta_2\sin\theta]^2\end{array}\right\}}{2p(n)^2}$$

The expanded NMSE equation can be simplified from the four quadrant equation and the negligible DC component equation into an NMSE phase error equation.

$$NMSE(\tilde{x}_{m1}, \tilde{x}_{m2}) = \delta_1^2 + \delta_2^2 - 2\delta_1\delta_2 \cos 2\theta$$

From the NMSE phase error equation, some phase shifter setting errors will not be detectable for certain values of $\theta$. For example, if $\theta = \pi/2 + m\pi$, where m is an integer, and $\delta_1 = -\delta_2$, the calculated NMSE would be zero even though $\delta_1$ and $\delta_2$ are nonzero. Similarly, if $\theta = m\pi$, and $\delta_1 = \delta_2$, the calculated NMSE would also be zero even though $\delta_1$ and $\delta_2$ are nonzero. To determine the optimum value $\theta$ for use in detecting and correcting phase shifter setting errors, the error between the measured waveforms and the actual waveform are analyzed. Substituting the first waveform equation and into the NMSE equation yields the NMSE between the first measured waveform and the actual waveform providing a first actual phase error equation.

$$NMSE(\tilde{x}, \tilde{x}_{m1}) = \sum_n \frac{[q(n)\delta_1]^2 + [p(n)\delta_1]^2}{2p(n)^2} = \delta_1^2$$

Similarly, substituting the second waveform equation into the NSE equation yields the NMSE between the second measured waveform and the actual waveform providing a second actual phase error equation.

$$NMSE(\tilde{x}, \tilde{x}_{m2}) = \sum_n \frac{[q(n)\delta_2]^2 + [p(n)\delta_2]^2}{2p(n)^2} = \delta_2^2$$

The first and second actual phase error equations describe the error in the first and second measurements, respectively. An NMSE software algorithm can be used to phase align the two measured waveforms. Optimal phase alignment between the two measured waveforms is achieved when the NMSE is minimized. The phase-aligned waveforms may be averaged to yield a prediction of the actual waveform using an actual average waveform equation.

$$\tilde{x}_{ma} = \frac{1}{2}(\tilde{x}_{m1}e^{-j\theta} + \tilde{x}_{m2})$$

$$= p(n)\cos\theta + q(n)\sin\theta + \frac{1}{2}q(n)\delta_1\cos\theta + \frac{1}{2}p(n)\delta_1\sin\theta +$$

$$\frac{1}{2}q(n)\delta_2\cos\theta - \frac{1}{2}p(n)\delta_2\sin\theta + j\left[q(n)\cos\theta - p(n)\sin\theta + \right.$$

$$\left.\frac{1}{2}p(n)\delta_1\cos\theta - \frac{1}{2}q(n)\delta_1\sin\theta + \frac{1}{2}p(n)\delta_2\cos\theta + \frac{1}{2}q(n)\delta_2\sin\theta\right]$$

Calculating the NMSE between this average waveform and the actual waveform yields an actual average phase error NMSE equation.

$$NMSE(\tilde{x}, \tilde{x}_{ma}) =$$

$$\frac{1}{4}\sum_n \frac{\left\{\begin{array}{l}[q(n)\delta_1\cos\theta + p(n)\delta_1\sin\theta + q(n)\delta_2\cos\theta - p(n)\delta_2\sin\theta]^2 + \\ [p(n)\delta_1\cos\theta - q(n)\delta_1\sin\theta + p(n)\delta_2\cos\theta + q(n)\delta_2\sin\theta]^2\end{array}\right\}}{2p(n)^2}$$

The actual average phase error NMSE equation can be simplified into a simplified actual average phase error NMSE equation.

$$NMSE(\tilde{x}, \tilde{x}_{ma}) = \frac{1}{4}[\delta_1^2 + \delta_2^2 + 2\delta_1\delta_2\cos 2\theta]$$

The average waveform has 3.0 dB lower thermal noise than either first or second measurements alone. The actual waveform is not measurable, hence the NMSE for the actual average phase error NMSE equation cannot be calculated from measurements. However the NMSE between the two measured waveforms is easily calculated. The NMSE between the two measured waveforms may be compared to the error in the average waveform. Comparison of NMSE phase error equation and simplified actual average phase error NMSE equation allow the range of θ to be calculated such that the NMSE between the two measured waveforms is greater than the error in the average waveform for all values of $\delta_1$ and $\delta_2$. This range of θ is given by a rotational phase limit equation.

$$\frac{1}{2}\cos^{-1}\left(\frac{3}{5}\right) + \frac{m\pi}{2} < \theta < (m+1)\frac{\pi}{2} - \frac{1}{2}\cos^{-1}\left(\frac{3}{5}\right)$$

In the rotational phase limit equation, m is an integer and the NMSE between the two waveform measurements is greater than the error in the average waveform for all values of $\delta_1$ and $\delta_2$. A practical choice of θ for measurements is the middle of the region defined by rotational phase limit equation with $\theta_{OPT}=\pi/4+m\pi/2$. For these values of θ, $NMSE(\tilde{x}_{m1},\tilde{x}_{m2})/4=NMSE(\tilde{x}, \tilde{x}_{ma})$. For $\theta_{OPT}$, the error of the average waveform is 6.0 dB lower than the NMSE between the two measurements. Hence, the $\theta_{OPT}=\pi/4+m\pi/2$ for removing phase imbalances.

Imbalances also occur for LO amplitude variations. Consider an LPE signal represented by $\tilde{x}(n)=p(n)+jq(n)$. When the LO power level is different between the inphase and quadrature measurement, the overall gain of the downconverting receiver will be different between the two measurements. There is no loss in generality by normalizing the complex signal amplitude. Hence, the error may be symmetrically distributed between the I and Q components to simplify error analysis.

The gain for the inphase measurement is $1+\epsilon_1$ and the gain for the quadrature component is $1-\epsilon_1$, the first measurement is defined by a first amplitude equation.

$$\tilde{x}_{m1}(n)=p_{m1}(n)+jq_{m1}(n)=p(n)(1+\epsilon_1)+j[q(n)(1-\epsilon_1)]$$

A second measurement is performed after rotation by θ, with an amplitude imbalance $\epsilon_2$, for providing a second amplitude equation.

$$\tilde{x}_{m2}(n)=(1+6\delta_2)[p(n)\cos\theta+q(n)\sin\theta]+j\{(1-\epsilon_2)[q(n)\cos\theta-p(n)\sin\theta]\}$$

The first and second measurements can again be compared by the NMSE equation. However, $\tilde{x}_{m1}(n)$ must be rotated analytically by an angle φ to line the first measurement with the second measurement with the rotation defined by a rotated amplitude equation.

$$\tilde{x}_{m1}e^{-j\phi}=(1+\epsilon_1)p(n)\cos\phi+(1-\epsilon_1)q(n)\sin\phi+j[(1-\epsilon_1)q(n)\cos\phi-(1+\epsilon_1)p(n)\sin\phi]$$

Using the second amplitude equation, the rotated amplitude equation, the difference NMSE equation first, the approximations of the four quadrant and negligible DC component equations, with $\epsilon_1, \epsilon_2 \ll 1$, φ=θ, for providing an NMSE amplitude error equation.

$$NMSE(\tilde{x}_{m1}, \tilde{x}_{m2})=\epsilon_1^2+\epsilon_2^2 2\epsilon_1\epsilon_2\cos 2\theta$$

Hence, the amplitude error in the first measured waveform can be calculated using a first NMSE amplitude error equation.

$$NMSE(\tilde{x}, \tilde{x}_{m1}) = \sum_n \frac{[q(n)\epsilon_1]^2 + [p(n)\epsilon_1]^2}{2p(n)^2} = \epsilon_1^2$$

Similarly, the error in the second measured waveform can be calculated using a second NMSE amplitude error equation.

$$NMSE(\tilde{x}, \tilde{x}_{m2}) = \sum_n \frac{[q(n)\epsilon_2]^2 + [p(n)\epsilon_2]^2}{2p(n)^2} = \epsilon_2^2$$

From the first and second amplitude error equation, the error in the average waveform is defined by an average NMSE amplitude error equation.

$$NMSE(\tilde{x}, \tilde{x}_{ma}) = \frac{1}{4}[\epsilon_1^2 + \epsilon_2^2 + 2\epsilon_1\epsilon_2\cos 2\theta]$$

Because of the similarity of the analysis, the optimal value of θ remains $\theta_{OPT}$ for both phase and amplitude error calculations. The use of $\theta_{OPT}$ for waveform measurements has the further advantage that it enables automatic detection of nonlinearities occurring after the downconversion, including baseband amplifier nonlinearities and A/D non-ideality. The system can be used for baseband nonlinearity detection. The first measurement without imbalances would be is defined by $\tilde{x}_{m1}(n)=p(n)+jq(n)$ while the second measurement is defined by $\tilde{x}_{m2}(n)=p(n)\cos\theta+q(n)\sin\theta+j[q(n)\cos\theta-p(n)\sin\theta]$. However, baseband nonlinearities will not be detectable for certain values of θ. For example, if θ=mπ/2, the original inphase and quadrature components (p, q) are transformed to either (p, q), (-q, p), (q, -p), or (-p, -q). In the process of calculating the NMSE, all these possibilities are transformed back to the original components, (p, q). Therefore, the NMSE between the two measurements would be zero even in the presence of baseband nonlinear distortion, assuming the nonlinearity is symmetric about zero voltage. However, the use of $\theta_{OPT}$ causes p(n) and q(n) to be mixed between the two measurements. For the second measurement, the inphase and quadrature components both contain equal magnitudes of p(n) and q(n). For a communications signal, p(n) and q(n) are uncorrelated quantities because they carry independent information. Mixing of p(n) and q(n) in equal magnitudes causes different baseband nonlinear distortions in the second measurement compared to the first measurement. The NMSE between the first and second measurements will provide a quantitative assessment of the nonlinearity.

By the minimization of the NMSE between the first and second measurements, the system may be optimized to reduce nonlinearities in the presence of noise. For analog components, lowering the signal level usually reduces the nonlinear error. For A/Ds, the signal level must be increased when the quantization error is dominant, or reduced if the dominant effect is waveform clipping when the signal exceeds the A/D range. The NMSE also includes thermal noise, which may be minimized by higher signal level or increased waveform averaging.

With $\theta=3\pi/4$ in waveform measurements, the overall error in the average waveform caused by both amplitude and phase imbalance is defined by an average actual NMSE amplitude and phase equation.

$$NMSE(\tilde{x}, \tilde{x}_{ma}) = \frac{1}{4}[\varepsilon_1^2 + \varepsilon_2^2 + \delta_1^2 + \delta_2^2]$$

With $\theta=3\pi/4$, the NMSE between the first and second measurements caused by both amplitude and phase imbalance is defined by measured NMSE amplitude and phase equation.

$$NMSE(\tilde{x}_{m1},\tilde{x}_{m2})=\epsilon_1^2+\epsilon_2^2+\delta_1^2+\delta_2^2$$

An NMSE between the two measured waveforms is less than −50 dB. The error in the averaged waveform is therefore less than −56 dB. The I/Q gain imbalance is less than 0.04 dB with a phase imbalance of less than 0.25 degrees. Such a small phase imbalance is achieved by adjusting the phase shifter to minimize NMSE. Gain imbalance is not easily adjusted, however, the mixer is used at an LO power that yields near minimum conversion loss. Hence, conversion loss is insensitive to variations in LO power. The LO power imbalance in dB between the two phase settings causes a much smaller I/Q gain imbalance in dB.

Measurement of the signal component at the LO frequency occurs with the use of $\theta=3\pi/4$ with four waveform measurements taken at the phases 0, and $\pi/2$, that is 0° and 90° for the first measurement and $3\pi/4$, and $5\pi/4$, that is, 135° and 225° for the second measurement.

The complete measurement system not only requires measurement of the waveforms, but a separate measurement of the component at the LO frequency. This is accomplished by means of the voltmeter. At each of the phases, the voltage at the mixer I port is recorded using the voltmeter. These four voltage measurements, along with voltage measurements at the four phase settings with zero signal level applied, can be used to extract the signal component at the LO frequency at 0, $\pi/2$, $3\pi/4$, and $5\pi/4$ phase shifts.

The receiver can use a continuously variable waveguide phase shifter that may be calibrated at any operating frequency within the specified waveguide band such as between 18 GHz to 26.5 GHz. A second receiver implementation uses a fixed-tuned, switched-coaxial-line phase shifter that has the advantage of shorter measurement time, but only operates at a fixed local oscillator frequency.

The continuously variable phase shifter can be implemented in a K-band waveguide, and is computer controlled. The continuously variable phase shifter utilizes a waveguide circulator and a waveguide non-contacting choke-type adjustable short circuit. The carrier signal enters the waveguide, reflects off the dumbbell short connected, and exits the circulator that is attached to the L port of the mixer. The axial position of the dumbbell short within the waveguide is changed by means of model 850G-HS motorized linear actuator manufactured by Newport Corporation. The actuator has 50 mm travel range with 2.0 µm bidirectional repeatability. This corresponds to a range of over 1000° at 18.0 GHz, and a repeatability of 0.04° at 22.0 GHz. The variation in loss through the phase shifter as a function of short position is approximately 0.3 dB, and is caused by VSWR effects. This results in a variation in Lo drive to the downconverting mixer, and causes minor errors in the measurement by slight variations in rf to baseband conversion loss at each of the Lo phase settings used. This variation in loss is minimized by setting the Lo drive into the mixer at a power level where the conversion loss is a minimum.

An optimization process is used to calibrate the phase shifter. Using starting values of the phase shifter positions derived from network analyzer measurements, communications signal waveforms are captured and the NMSE, and LO phase shift $\theta$ are calculated. The phase shifter positions are then varied with waveform measurements done after each variation, with the goal of attaining the lowest value of NMSE, and obtaining $\theta=135°$. In practice, an NMSE of better than −40 dB can be achieved, and with a value for $\theta$ in the range of 135±0.5°. When these values are achieved, the four phase shifter positions will be 0°, 90°, 135°, and 225°.

The second fixed-tuned phase shifter implementation uses coaxial microwave switches to switch different line lengths in and out of the LO path. For this phase shifter to achieve good performance, the loss through all the line lengths must be well matched, and the differential electrical length through the various paths must be stable over temperature and time, and relatively immune to shock and vibration. With 20 GHz carrier and using commercial SMA and 3.5 mm coaxial components, the switches used were HP 8765C single-pole, double throw, latching type, connected by means of SMA male barrels, SMA swept radius 90° elbows, and SMA airline phase trimmers. These switches were chosen because they could be operated by means of a 30.0 ms current pulse to effect the switching. This switching eliminates power dissipation and heating of the tuned line lengths, which has been seen to cause significant phase shifter setting errors. The phase trimmers were set approximately using a network analyzer, then the values were optimized in the same manner as the waveguide phase shifter. The variation in loss between the various paths was less than ±0.3 dB, and the accuracy of the phase shift values was as good as the waveguide phase shifter. This coaxial phase shifter is easier to construct and is faster in operation than the waveguide phase shifter. The main disadvantage of the coaxial design is that the line lengths are difficult to change, making it cumbersome to use when measured waveforms at different LO frequencies are needed.

As an example of the kinds of measurements that can be performed, and the accuracy that can be achieved, a quadrature-phase-shift-key (QPSK) waveform at a carrier frequency of 20.7 GHz and a symbol rate of 40 Megasymbols/second was measured. A 127-symbol sequence was measured, corresponding to a total time duration of the waveform of 3.172 µs. To show the errors more dramatically, a measurement can be performed where the continuously variable waveguide phase shifter was set intentionally to incorrect values. The phase shifter values were set at approximately 0°, 75°, 135°, and 210° and for a second error test the values were set to 0°, 75°, 120°, and 225°. For both error tests the two waveform measurements, $\tilde{x}_{m1}$ and $\tilde{x}_{m2}$ were rotated in software for best alignment with the actual best waveform measurement where the phase shifter valves are set to 0°, 90°, 135°, and 225°. The calculated NMSE between any two measurements is approximately −24 dB. The averaged measurements $\tilde{x}_{ma}$ show the advantage of averaging. The NMSE of the averaged waveform with the best waveform is −33 dB, while the NMSE of the any of the four skewed waveforms with the best waveform measurement was approximately −27 dB.

The accuracy of baseband complex signal measurements or the removal of imbalances in receiver systems has been improved. Two sets of inphase and quadrature waveforms are recorded. The first set using LO phase shifts of 0 and π/2, the second set using LO phase shifts of θ and π/2+θ. The normalized mean square error (NMSE) between the two measurements is a sensitive indication of I and Q phase and amplitude imbalance and baseband nonlinearities. Using θ=π/4+mπ/2, phase and amplitude imbalances of any sign and magnitude cause NMSE errors. Averaging the two measurements for these values of θ yields a measurement error 6.0 dB less than the NMSE between the two measurements. Because the NMSE can be determined for each set of two signal measurements, the measurement system may be adjusted to minimize I and Q imbalances and nonlinearities. Such adjustments enable the error caused by I and Q imbalances to be consistently below −56 dB. This accuracy is useful for communications system modeling efforts and receiver implementations.

The system can be applied to the calibration of any direct demodulation receiver. The receiver I and Q downconverter may be connected to a waveform recording instrument to measure a repetitive complex baseband signal twice, with a rotation of LO phase performed between the two measurements, and then compare the two measurements by means of NMSE. This provides a sensitive indicator of receiver I and Q imbalances and nonlinearities. The system can be applied to test systems as well as communication systems for reducing downconverter imbalances. Those skilled in the art can make enhancements, improvements, and modifications to the invention, and these enhancements, improvements, and modifications may nonetheless fall within the spirit and scope of the following claims.

What is claimed is:

1. A system for determining lowpass equivalencies of generated baseband signals, the system comprising,
   carrier generator means for providing a local carrier,
   phase shifter means for phase shifting the local carrier by phase shifts to provide phase shifted carriers, the phase shifts being 0°, 90°, θ and θ+π/2 where θ=π/4+mπ/2 where m is an integer,
   downconverter means for downconverting an input signal into the generated baseband signals, the input signal having a carrier modulated by an input baseband signal, the phase shifted carriers being phase shifted replicas of the carrier, and
   processor means for receiving the generated baseband signals, the processor means for determining the lowpass equivalencies of the generated baseband signals.

2. The system of claim 1 wherein,
   the processor means is further for determining signal imbalances in the generated baseband signals created during downconversion of the input signal by the downconverter means.

3. The system of claim 1 wherein,
   the processor means is further for determining signal imbalances in the generated baseband signals created during downconversion of the input signal by the downconverter means, and
   the signal imbalances consisting of phase and amplitude signal imbalances.

4. The system of claim 1 wherein,
   the processor means is further for determining signal imbalances in the generated baseband signals created during downconvereion of the input signal by the downconverter means,
   the processor means is further for removing the signal imbalances from the baseband signals, and
   the signal imbalances consisting of phase and amplitude signal imbalances.

5. The system of claim 1 wherein,
   the processor means is further for removing the signal imbalances from the baseband signals, and
   the processor means computes lowpass equivalencies of the generated baseband signals, aligns the lowpass equivalencies in phase and time, and averages the aligned lowpass equivalencies into an average baseband signal being a replica of the input baseband signal.

6. The system of claim 1 wherein,
   the input signal is a quadrature signal having an inphase component and a quadrature component, and
   the generated baseband signals are inphase generated baseband signals and quadrature generated baseband signals.

7. The system of claim 1 wherein,
   the input signal is a quadrature signal having an inphase component and a quadrature component,
   the generated baseband signals are first and second generated inphase baseband signals and first and second generated quadrature baseband signals, and
   the lowpass equivalencies being a first lowpass equivalence of the first generated inphase baseband signal and the first generated quadrature baseband signal and being a second lowpass equivalence of the second generated inphase baseband signal and the second generated quadrature baseband signal.

8. The system of claim 1 wherein,
   m equals 1 and the phase shirts are 0°, 90°, 135°, and 225°.

9. The system of claim 1 wherein,
   the processor means is further for removing the signal imbalances from the generated baseband signals, and
   the processor means is further for generating a replica baseband signal being a replica of the input baseband signal.

10. The system of claim 1 wherein,
    the processor means is further for removing the signal imbalances from the generated baseband signals, and
    the processor means is further for generating a replica baseband signal from the generated baseband signals, the replica baseband signal being a replica of the input baseband signal.

11. The system of claim 1 wherein,
    the system is a receiver,
    the input baseband signal is an original data stream for modulating the carrier,
    the processor means is further for removing the signal, imbalances from the generated baseband signals,
    the processor means is further for generating a replica baseband signal from the generated baseband signals, the replica baseband signal being a replica of the input baseband signal,
    system further comprising,
    data demodulating means for demodulating the replica baseband signal into a replica data stream, the replica data stream being a replica of the original data stream.

12. A system for determining lowpass equivalencies of generated baseband signals, the system comprising, carrier generator means for providing a local carrier,
phase shifter means for phase shifting the local carrier by phase shifts to provide phase shifted carriers, the phase shifts being 0°, 90°, θ and θ+π/2 where θ=π/4+mπ/2 where m is integer,
downconverter means for downconverting an input signal into the generated baseband signals, the input signal having a carrier modulated by an input baseband signal, the phase shifted carriers being phase shifted replicas of the carrier, and
processor means for receiving the generated baseband signals, the processor means for determining the lowpass equivalencies of the generated baseband signals, wherein,
the input signal is a quadrature signal having an inphase component and quadrature component,
the generated baseband signals are first and second generated inphase baseband signals and first and second generated quadrature baseband signals, and
the lowpass equivalencies being a first lowpass equivalence of the first generated inphase baseband signal generated using the 0° phase shift, and the first generated quadrature baseband signal using the 90° phase shift and being a second lowpass equivalence of the second generated inphase baseband signal generated using the θ phase shift and the second generated quadrature baseband signal generated using the θ+π/2 phase shift.

13. A receiver for removing signal imbalances created during downconversion of an input signal having an input baseband signal modulating, a carrier and transmitted from a transmitter, the receiver comprising,
carrier generator means for providing a local carrier,
phase shifter means for phase shifting the local carrier by phase shifts to provide phase shifted carriers the phase shifts being 0°, 90°, θ and θ+π/2 where θ=π/4+mπ/2 where m is an integer,
downconverter means for downconverting an input signal into the generated baseband signals, the input signal having a carrier modulated by an input baseband signal, the phase shifted carriers being phase shifted replicas of the carrier, and
processor means for receiving the, generated baseband, signals, the processor means for determining the lowpass equivalencies of the generated baseband signals, the processor means removing the signal imbalances from the generated baseband signals from the processor means generating a replica baseband signal from the generated baseband signals, the replica baseband signal being a replica of the input baseband signal,
wherein,
the input signal is a quadrature signal having an inphase component and a quadrature component,
the generated baseband signals are first and generated inphase baseband signals and first and second generated quadrature baseband signals, and
the lowpass equivalencies being a first lowpass equivalence of the first generated inphase baseband signal generated using the 0° phase shift, and the first generated quadrature baseband signal using the 90° phase shift and being a second lowpass equivalence of the second generated inphase baseband signal generated using the θ phase shift and the second generated quadrature baseband signal generated using the θ+π/2 phase shift.

14. The receiver of claim 13 wherein,
the carrier means is carrier tracking loop for receiving the input signal, the carrier tracking loop tracking the carrier of the input and generating the local carrier,
the phase shift means are for four phase shifters,
m equals 1, and
the phase shifts are 0°, 90°, 135°, and 225°.

15. The receiver of claim 13 wherein,
the downconverter means are four mixers for respectively generating the first and second generated inphase baseband signals and first and second generated quadrature baseband signals.

16. The receiver of claim 13 wherein,
the carrier means is carrier tracking loop for receiving the input signal, the carrier tracking loop tracking the carrier of the input and generating the local carrier,
the phase shift means are four phase shifters,
m equals 1 and the phase shifts are 0°, 90°, 135°, and 225°, and
the downconverter means are four mixers for respectively generating the first and second generated inphase baseband signals and first and second generated quadrature baseband signals.

17. The receiver of claim 13 wherein m equals 1 and the phase shifts are 0°, 90°, 135°, and 225°.

18. The receiver of claim 13 wherein,
the processor means is further for removing the signal imbalances from the baseband signals, and
the processor means computes lowpass equivalencies of the generated baseband signals, aligns the lowpass equivalencies in phase and time, and averages the aligned lowpass equivalencies into an average baseband signal being a replica of the input baseband signal.

19. The receiver of claimer 13 wherein,
the input signal is an original data stream for modulating the carrier,
the receiver further comprising,
data demodulating means for demodulating the replica baseband, signal into a replica data stream, the replica data stream being a replica of the original data stream.

20. The receiver of claim 13 wherein,
the input signal is a quadrature phase shift keying input signal.

* * * * *